(12) United States Patent
Hokazono et al.

(10) Patent No.: US 9,430,934 B2
(45) Date of Patent: Aug. 30, 2016

(54) WIRELESS COMMUNICATION DEVICE AND LOCATOR SYSTEM

(71) Applicant: Panasonic Intellectual Property Management Co., Ltd., Osaka (JP)

(72) Inventors: Shinya Hokazono, Fukuoka (JP); Takashi Watanabe, Fukuoka (JP); Katsumi Nakagawa, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 164 days.

(21) Appl. No.: 14/354,108

(22) PCT Filed: Sep. 27, 2013

(86) PCT No.: PCT/JP2013/005771
§ 371 (c)(1),
(2) Date: Apr. 24, 2014

(87) PCT Pub. No.: WO2014/057624
PCT Pub. Date: Apr. 17, 2014

(65) Prior Publication Data
US 2014/0300472 A1 Oct. 9, 2014

(30) Foreign Application Priority Data
Oct. 12, 2012 (JP) ................. 2012-226719

(51) Int. Cl.
*G08B 1/08* (2006.01)
*G08B 25/10* (2006.01)
(Continued)

(52) U.S. Cl.
CPC ............ *G08B 25/10* (2013.01); *G08B 25/003* (2013.01); *H04M 1/72502* (2013.01); *H04M 2250/08* (2013.01)

(58) Field of Classification Search
CPC ...................................... G08B 25/10
USPC ................................. 340/539.324
See application file for complete search history.

(56) References Cited

U.S. PATENT DOCUMENTS 5,689,238 A    11/1997  Cannon, Jr. et al.
6,067,018 A *   5/2000  Skelton ............... A01K 11/008
                                                    119/721

(Continued)

FOREIGN PATENT DOCUMENTS

JP           10-45221 A    2/1998
JP        2002-057789 A    2/2002

(Continued)

OTHER PUBLICATIONS

Extended European Search Report dated Oct. 19, 2015, for corresponding EP Application No. 13845026.7-1810/2908510, 8 pages.

(Continued)

*Primary Examiner* — Eric M Blount
(74) *Attorney, Agent, or Firm* — Seed IP Law Group PLLC

(57) ABSTRACT

There is provided a locator system that facilitates registration of a calling apparatus to be added and a locator. Portable unit communicates with base unit with a DECT protocol. Moreover, portable unit serves as a calling apparatus that transmits a call signal to locator to be attached to an item with a locator protocol. Portable unit transmits registration information to base unit by wireless communication as being triggered by registration with locator in one-to-one correspondence being ended. In a case where a request is received from portable unit as a calling apparatus to be added, base unit transmits stored registration information received from portable unit to portable unit. Portable unit stores the registration information received from base unit.

13 Claims, 11 Drawing Sheets

(51) Int. Cl.
*H04M 1/725* (2006.01)
*G08B 25/00* (2006.01)

(56) References Cited

U.S. PATENT DOCUMENTS

| | | | | |
|---|---|---|---|---|
| 6,484,027 B1* | 11/2002 | Mauney | ............ | H04M 1/72519 |
| | | | | 455/418 |
| 6,577,239 B2 | 6/2003 | Jespersen | | |
| 6,956,480 B2 | 10/2005 | Jespersen | | |
| 7,502,619 B1* | 3/2009 | Katz | ............ | G01S 5/02 |
| | | | | 340/531 |
| 8,823,491 B2* | 9/2014 | Luke | ............ | G08B 21/24 |
| | | | | 340/539.1 |
| 2001/0052846 A1 | 12/2001 | Jespersen | | |
| 2003/0122671 A1 | 7/2003 | Jespersen | | |
| 2005/0270143 A1* | 12/2005 | Wang | ............ | H04N 7/186 |
| | | | | 340/286.06 |
| 2008/0203159 A1* | 8/2008 | Luetzelberger | ............ | G06K 7/10079 |
| | | | | 235/385 |
| 2009/0315717 A1* | 12/2009 | Soomro | ............ | G06K 7/0008 |
| | | | | 340/572.1 |
| 2010/0082591 A1* | 4/2010 | Koba | ............ | G08B 13/1427 |
| | | | | 707/706 |
| 2011/0018712 A1 | 1/2011 | Luetzelberger | | |
| 2011/0285506 A1* | 11/2011 | Hillis | ............ | G08B 21/0238 |
| | | | | 340/8.1 |

FOREIGN PATENT DOCUMENTS

| | | |
|---|---|---|
| JP | 2006-081036 A | 3/2006 |
| JP | 2006-211014 A | 8/2006 |
| JP | 2006-303942 A | 11/2006 |
| JP | 3133228 U | 6/2007 |
| JP | 2008-503826 A | 2/2008 |
| JP | 2008-070964 A | 3/2008 |
| JP | 2010-086384 A | 4/2010 |
| JP | 2010-161643 A | 7/2010 |
| JP | 2005-003627 A | 6/2016 |
| WO | WO 0046774 A1 * | 8/2000 ......... G08B 21/0288 |
| WO | 01/37004 A1 | 5/2001 |

OTHER PUBLICATIONS

International Search Report dated Nov. 19, 2013, for corresponding International Application No. PCT/JP2013/005771, 4 pages.

* cited by examiner

WIRELESS COMMUNICATION DEVICE AND LOCATOR SYSTEM

TECHNICAL FIELD

The present invention relates to a wireless communication apparatus and a locator system that are used to detect an item.

BACKGROUND ART

A locator system is known as a wireless communications system used to detect an item (also referred to as "object" such as a key, purse, portable device or pet) (see, for example, PTL 1). The locator system includes a locator attached to the item and a calling apparatus carried by the user. The locator and the calling apparatus can perform near field wireless communication. When the user wants to look for an item, the user operates the calling apparatus. Upon reception of a wireless signal sent by the user's operation, the locator makes a notification sound. The user can thus recognize that the item is present in the direction in which the notification sound can be heard.

CITATION LIST

Patent Literature

PTL 1
Japanese Unexamined Patent Application Publication (Translation of PCT Application) No. 2008-503826

SUMMARY OF INVENTION

Technical Problem

A conventional locator system including one disclosed in PTL 1 registers a locator and a calling apparatus in a one-to-one correspondence (pair), however. Therefore, when the user wants to add a calling apparatus to one locator, i.e., every time a calling apparatus is added, both the calling apparatus to be added and the locator need to be registered. As a result, there arises a problem in that the user has to register the calling apparatus and the locator.

An object of the present invention is to provide a wireless communication apparatus and a locator system that can facilitate the registration of a calling apparatus to be added and a locator.

Solution to Problem

A wireless communication apparatus according to an aspect of the present invention is a wireless communication apparatus configured to communicate with a management apparatus using a first near field wireless communication protocol and to transmit, using a second near field wireless communication protocol, a signal to make a notification to a locator to be attached to an item, the wireless communication apparatus including a transmission section that transmits registration information related to the locator to the management apparatus as being triggered by end of registration of the wireless communication apparatus with the locator in one-to-one correspondence.

A wireless communication apparatus according to an aspect of the present invention is a wireless communication apparatus configured to communicate with a calling apparatus using a first near field wireless communication protocol, the calling apparatus being configured to transmit, using a second near field wireless communication protocol, a signal to make a notification to a locator to be attached to an item, the wireless communication apparatus including: a reception section that receives registration information which is related to the locator and which is transmitted from the calling apparatus as being triggered by end of registration of the calling apparatus with the locator in one-to-one correspondence; a registration information storage section that stores the received registration information; and a transmission section that transmits the stored registration information to a calling apparatus different from the calling apparatus when a download request for registration information is received from the different calling apparatus.

A wireless communication apparatus according to an aspect of the present invention is a wireless communication apparatus configured to perform near field wireless communication with a calling apparatus which is attached to a predetermined item and which is registered in advance, and to output a notification sound upon reception of a call signal from the calling apparatus, the wireless communication apparatus including a control section that starts reception of the call signal for a certain time period after a battery is loaded, and that enables a state where registration of the wireless communication apparatus with the calling apparatus in one-to-one correspondence is allowed.

A locator system according an aspect of the present invention includes: a locator that is attached to a predetermined item and that outputs a notification sound; a calling apparatus that transmits, using a second near field wireless communication protocol, a call signal to output the notification sound to the locator; and a management apparatus that communicates with the calling apparatus using a first near field wireless communication protocol, in which the calling apparatus comprises a transmission section that transmits registration information related to the locator to the management apparatus as being triggered by end of registration of the calling apparatus with the locator in one-to-one correspondence.

Advantageous Effects of Invention

According to the present invention, it is possible to facilitate the registration of a calling apparatus to be added and a locator.

DESCRIPTION OF EMBODIMENTS

In the following, an embodiment of the present invention is described.

Figure 1:
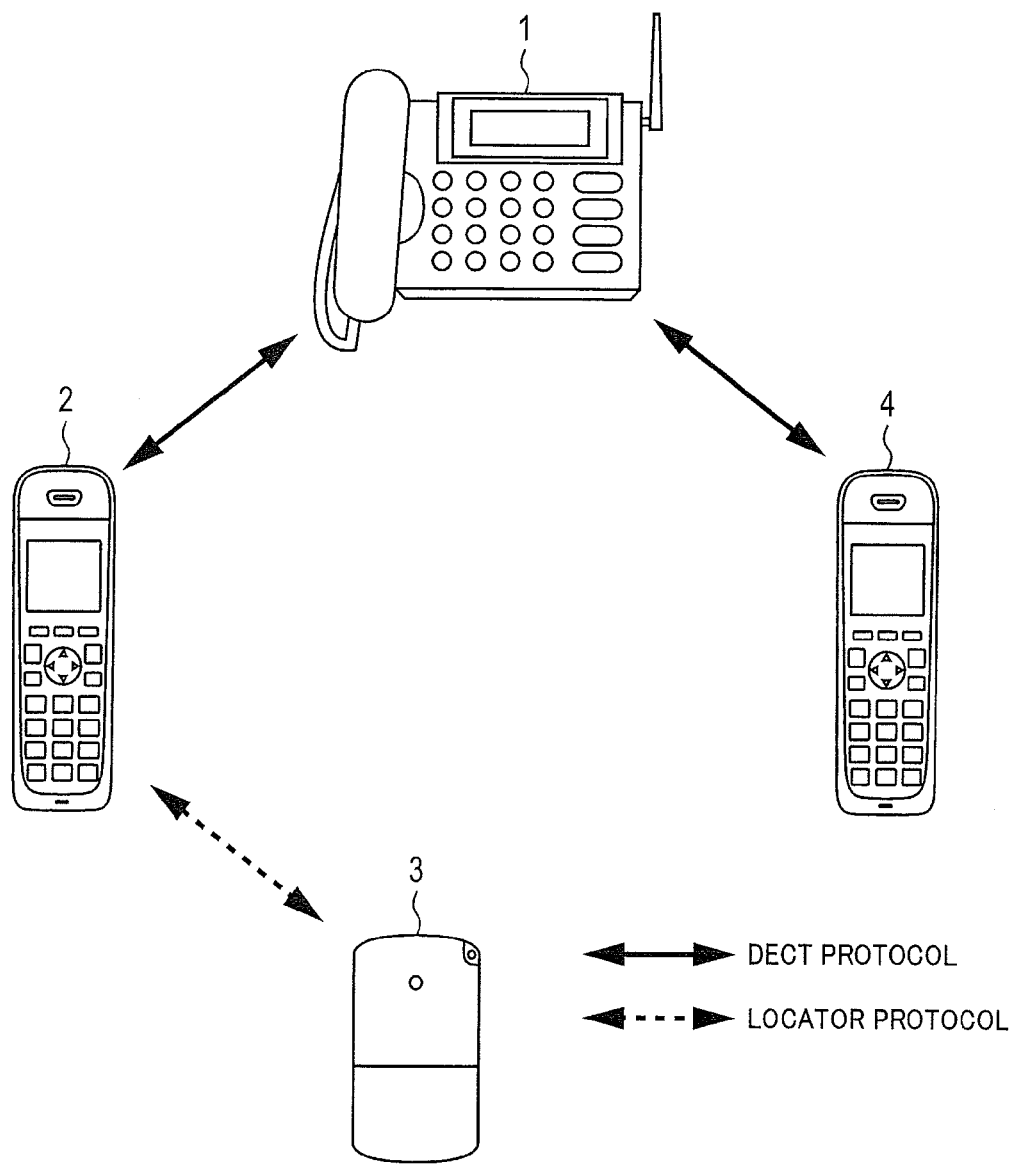
FIG. 1 is a diagram illustrating an example of a locator system according to an embodiment of the present invention.

First, a configuration example of a locator system (an example wireless communications system) according to the present embodiment is described. FIG. 1 is a diagram illustrating an example of the locator system according to the present embodiment.

In FIG. 1, the locator system includes base unit 1, portable units 2 and 4 and locator 3. Base unit 1 and portable units 2 and 4 form a cordless telephone system. Portable units 2 and 4 can be carried by the user and can function as portable units of the cordless telephone system or calling apparatuses of locator 3. Meanwhile, base unit 1 can function as a base unit of the cordless telephone system or a management apparatus (server) that aggregates and manages information from portable units 2 and 4.

In FIG. 1, base unit 1 serves as a reference for synchronization between base unit 1 and portable unit 2. Portable unit 2 is an apparatus (slave apparatus) that operates according to the synchronization reference of base unit 1, and locator 3 is a slave apparatus that operates according to the synchronization reference of portable unit 2. Portable unit 2 is a mobile communication terminal such as a wireless handset of the cordless telephone device and a portable digital assistance (PDA), for example.

For example, base unit 1 and portable units 2 and 4 perform wireless communication with a TDMA (Time Division Multiple Access)/TDD (Time Division Duplex) communication protocol. In the present embodiment, for example, the wireless communication is performed using a DECT (Digital Enhanced Cordless Telecommunications (registered trademark)) protocol.

Portable unit 2 and locator 3 perform wireless communication with a locator protocol. The locator protocol (an example of a second near field wireless communication protocol) is a communication protocol compliant with the DECT standard with respect to the wireless format and the frequency. Here, as an example, FIG. 1 shows that, although portable unit 2 and locator 3 are already registered and therefore are in a state where wireless communication is possible, portable unit 4 and locator 3 are not registered yet and therefore are in a state where wireless communication is not possible.

Figure 2:
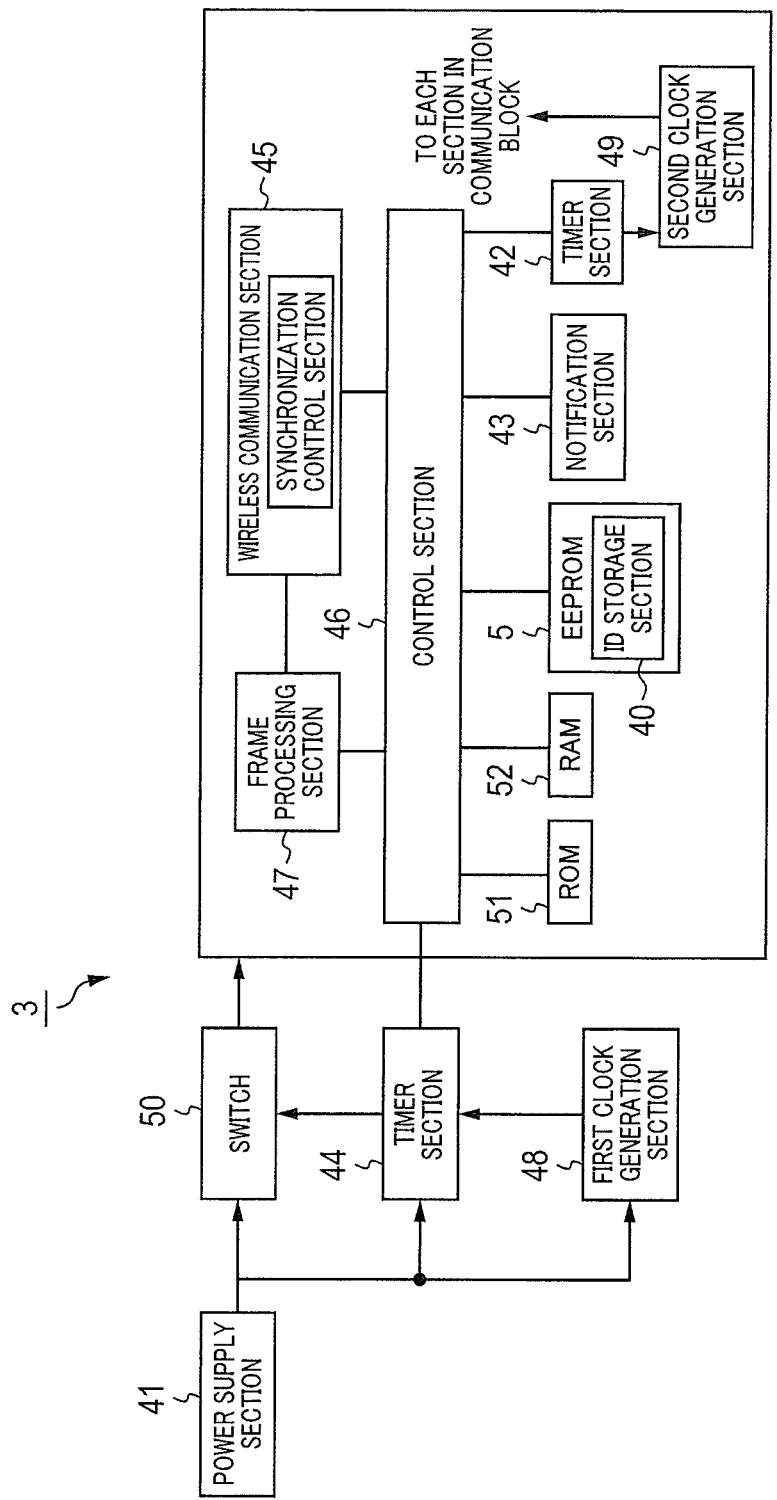
FIG. 2 is a block diagram illustrating an example of the configuration of a locator according to an embodiment of the present invention.

Next, a configuration example of locator 3 is described. FIG. 2 is a block diagram illustrating a configuration example of locator 3.

In FIG. 2, locator 3 has a communication block that manages the main operation of communication, power supply section 41, timer section 44, switch 50 and first clock generation section 48 that are outside this communication block. The communication block has frame processing section 47, wireless communication section 45, control section 46, ROM (Read Only Memory) 51, RAM (Random Access Memory) 52, EEPROM (Electrically Erasable Programmable Read-Only Memory) 5, notification section 43, timer section 42 and second clock generation section 49.

Power supply section 41 is loaded with a battery as a power source for locator 3. For example, locator 3 is powered on by putting the battery in power supply section 41 and powered off by removing the battery from power supply section 41.

First clock generation section 48 generates a low-speed clock signal used to operate timer section 44, on the basis of the power source that is continuously supplied by power supply section 41. For example, first clock generation section 48 includes a crystal oscillation circuit.

Timer section 44 operates as the first timer. The first timer counts a predetermined time as a sleep period of the communication block and switches switch 50 from OFF to ON every time the period expires. That is, timer section 44 is supplied with the low-speed clock from first clock generation section 48 and performs count processing according to this low-speed clock. Timer section 44 records a value (expiration value) for defining the sleep period in the register (which is not illustrated). Further, timer section 44 counts up according to the clock from first clock generation section 48 in the sleep state and ends the count when the count value reaches the expiration value. Further, timer section 44 notifies switch 50 that the count is ended. In other words, timer section 44 starts time keeping (activates the first timer) as triggered by interruption of the power supply to the communication block and counts a predetermined time while the communication block is stopped. Further, when the time keeping ends (the first timer expires), timer section 44 switches switch 50 to ON and starts the supply of the power source to the communication block.

Switch 50 connects the communication block to the battery of power supply section 41 when it is in the ON state, and interrupts the communication block from the battery of power supply section 41 when it is in the OFF state. Locator 3 performs intermittent reception operation, and repeats operation of returning from the sleep period in a predetermined cycle, performing the reception operation in a predetermined period and returning to the sleep. Switch 50 switches from the OFF state to the ON state according to the count end notification from timer section 44 described above and starts the power supply to the communication block.

Second clock generation section 49 generates a high-speed clock signal used to operate each section of the communication block, on the basis of the power source supplied from power supply section 41 through switch 50. For example, second clock generation section 49 includes a crystal oscillation circuit. This second clock generation section 49 supplies the high-speed clock that is faster than the low-speed clock of first clock generation section 48 to each section of the communication block, and operation for communication is controlled by this high-speed clock.

Using the locator protocol, wireless communication section 45 receives a call signal from portable unit 2 and transmits a response signal corresponding thereto to portable unit 2. For example, wireless communication section 45 includes a radio antenna. A synchronization control section installed in wireless communication section 45 determines the communication timing of a communication signal by wireless communication section 45 on the basis of a reference clock of second clock generation section 49. Thus, wireless communication section 45 has the synchronization control section that performs timing control to maintain synchronization, and adopts a similar hardware configuration to wireless communication section 24 of portable unit 2 described later. However, wireless communication section 45 performs wireless communication with portable unit 2 by the locator protocol a part of which is altered based on the above-mentioned DECT scheme according to the use of the locator. Here, it is assumed that "wireless communication" in this specification includes wireless transmission and wireless reception.

Frame processing section 47 communicates with portable unit 2 through wireless communication section 45. For example, frame processing section 47 includes a communication module to perform DECT communication with portable unit 2.

Moreover, upon receiving a call signal including locator information of locator 3 from portable unit 2, frame processing section 47 replies a response signal.

ROM 51 stores a control program and various kinds of data used by control section 46.

Control section 46 performs operation on the basis of the clock signal generated in second clock generation section 49 and controls the entire operation of the communication block. For example, control section 46 includes a CPU (Central Processing Unit). For example, control section 46 realizes the function of notification section 43 by executing the control program stored in ROM 51. At this time, control section 46 receives instruction information, which is included in a call signal and transmitted from portable unit 2, via frame processing section 47. Further, control section 46 controls the operation of notification section 43 according to the received instruction information.

Timer section 42 can separately measure a plurality of time periods. For example, timer section 42 operates as a second timer. The second timer starts time keeping (activates the second timer) using the reception of a signal from portable unit 2 as a trigger and ends the time keeping (ends the second timer) when a predetermined time period passes. Moreover, timer section 42 operates as a third timer. The third timer starts time keeping (activates the third timer) using the loading of the battery in power supply section 41 as a trigger and ends the time keeping when a predetermined time period passes (the third timer expires).

RAM 52 is a work memory of control section 46.

EEPROM 5 has ID storage section 40. ID storage section 40 is assigned to an area in EPROM 5. ID storage section 40 stores the ID of locator 3 (hereafter referred to as "locator ID"). The locator ID is a unique identifier assigned beforehand.

In a case where a call signal is received from portable unit 2, notification section 43 outputs the notification sound to notify the user of the position of locator 3. For example, notification section 43 includes a small speaker. Examples of the notification sound include a beep sound.

Here, the function sections provided to locator 3 are not limited to the function sections illustrated in FIG. 2 and may include another function section. Such another function section may realize a primary function of locator 3 or realize an auxiliary function to assist the primary function.

The configuration example of locator 3 has been described above.

Figure 3:
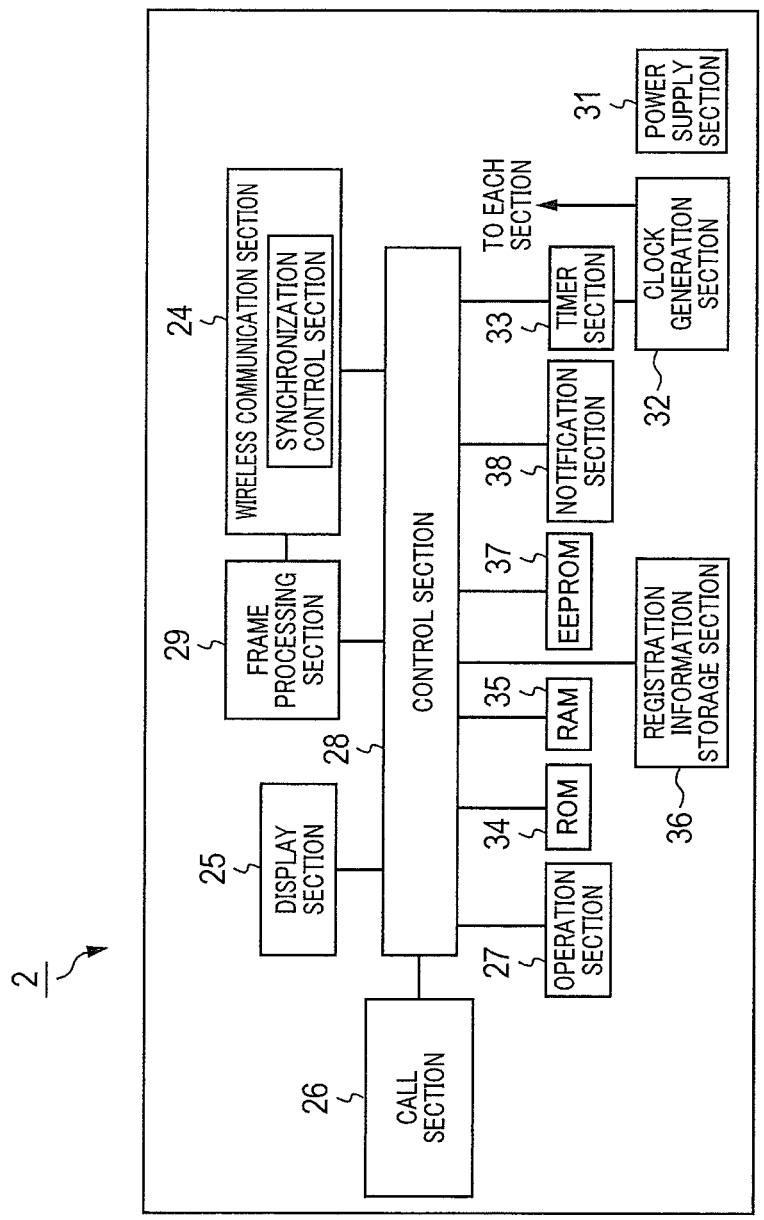
FIG. 3 is a block diagram illustrating an example of the configuration of a portable unit according to an embodiment of the present invention.

Next, a configuration example of portable unit 2 (or portable unit 4) is described. FIG. 3 is a block diagram illustrating the configuration example of portable unit 2.

In FIG. 3, portable unit 2 has operation section 27, display section 25, call section 26, wireless communication section 24, registration information storage section 36, control section 28, frame processing section 29, ROM 34, RAM 35, EEPROM 37, notification section 38, power supply section 31, clock generation section 32 and timer section 33. Portable unit 2 has similar functions to part of the functions of base unit 1 and performs wireless communication with base unit 1 by the above-mentioned DECT scheme. Here, an explanation is given below using portable unit 2 as an example.

Power supply section 31 supplies a power source to operate portable unit 2. For example, power supply section 31 includes a rechargeable battery pack.

Clock generation section 32 generates a clock signal used to operate each section of portable unit 2 on the basis of the power source supplied from power supply section 31. For example, clock generation section 32 includes a crystal oscillation circuit.

ROM 34 stores a control program and various kinds of data to be used by control section 28.

EEPROM 37 is a work memory of control section 28.

For example, RAM 35 stores information on at least one of a transmission channel and slot of a control signal of base unit 1 or information on the scheduled reception timing. Information on the transmission channel and transmission slot of the control signal is an example of information on the time position at which the control signal is transmitted. Moreover, for example, RAM 35 stores information on the time lag acquired by learning processing or information on correction parameters.

Wireless communication section 24 performs wireless communication with base unit 1 by the DECT protocol in a normal telephone mode. That is, wireless communication section 24 performs synchronization according to the control signal from base unit 1.

In wireless communication section 24, the synchronization control section determines whether wireless communication section 24 normally receives the control signal serving as a synchronizing signal from the base unit. That is, it is determined whether wireless communication section 24 does not lose sight of the control signal and receives the control signal at a predetermined reception timing. Examples of the case where wireless communication section 24 loses sight of the control signal include a case where the power source for base unit 1 that transmits the control signal to portable unit 2 is turned off or where wireless wave interference occurs at the reception timing of the control signal.

A correction parameter to correct the communication timing is determined by learning in an asynchronous state and stored in RAM 35. Therefore, this correction parameter is used in the lost-sight state.

Using the locator protocol, wireless communication section 24 transmits a call signal to locator 3 and receives a response signal corresponding thereto from locator 3. For example, wireless communication section 24 includes a radio antenna. The synchronization control section of wireless communication section 24 determines the communication timing of a communication signal by wireless communication section 24 on the basis of the reference clock of clock generation section 32.

Frame processing section 29 embeds frame transmission information suitable for the operation mode at that time and passes it to wireless communication section 24. The frame configuration of DECT is used in a case where communication is performed with base unit 1, and the frame configuration for the locator is used in a case where communication is performed with locator 3. In the case of performing communication with locator 3, the communication is performed by the locator protocol a part of which is altered according to the specification of the locator.

Frame processing section 29 transmits a call signal that requests the reply of a response signal to locator 3 when there is an activation operation to accept the start operation and exit operation of a mode (hereafter referred to as "locator mode") that searches for locator 3 from the user through operation section 27. At this time, frame processing section 29 includes identification information of a locator selected by control section 28 in the call signal. In addition, frame processing section 29 includes instruction information that instructs the presence or absence of notification by the locator selected by control section 28 in the call signal.

Operation section 27 is a button to receive the user's operation. Examples of the user's operation include an operation to originate a call (call originating operation), an operation to receive a call (call reception operation), an operation to register locator 3 (locator registration operation), an operation to call locator 3 (calling operation) and an operation to download registration information from base unit 1 (registration information download operation). Examples of the registration information include the ID of a locator that has been registered with a portable unit.

Display section 25 displays the registration information stored in registration information storage section 36 to the user. Moreover, display section 25 may also be used to output other information (for example, a telephone number or an operation menu of portable unit 2). For example, display section 25 includes a liquid crystal display.

Call section 26 includes a device to make a call, that is, a voice amplifier for voice communication, a microphone to be used for transmission and a speaker to be used to receive a call.

Registration information storage section 36 stores the ID of portable unit 2 (hereafter referred to as "portable unit ID"). The portable unit ID is a unique identifier to be assigned beforehand. Moreover, when it is possible to acquire the locator ID from a locator of the registration target, registration information storage section 36 stores the acquired locator ID. Here, as described above, the locator ID acquired from the locator of the registration target is an example of the registration information. Moreover, registration information storage section 36 stores the base unit ID acquired at the time of registration in base unit 1.

Timer section 33 starts time keeping using transmission of a signal to call locator 3 as a trigger on the basis of the clock signal from clock generation section 32 and ends the time keeping when a predetermined time passes.

Control section 28 controls the operation of entirety of portable unit 2 by cooperating with each section described above. The control made by control section 28 is described later.

When a call signal is received from base unit 1, notification section 38 outputs the notification sound. For example, notification section 38 includes a small speaker.

Here, the function sections provided to portable unit 2 are not limited to the function sections illustrated in FIG. 3 and may include another function section. Another function section may realize a primary function of portable unit 2 or realize an auxiliary function to assist the primary function.

The configuration example of portable unit 2 has been described thus far.

Figure 4:
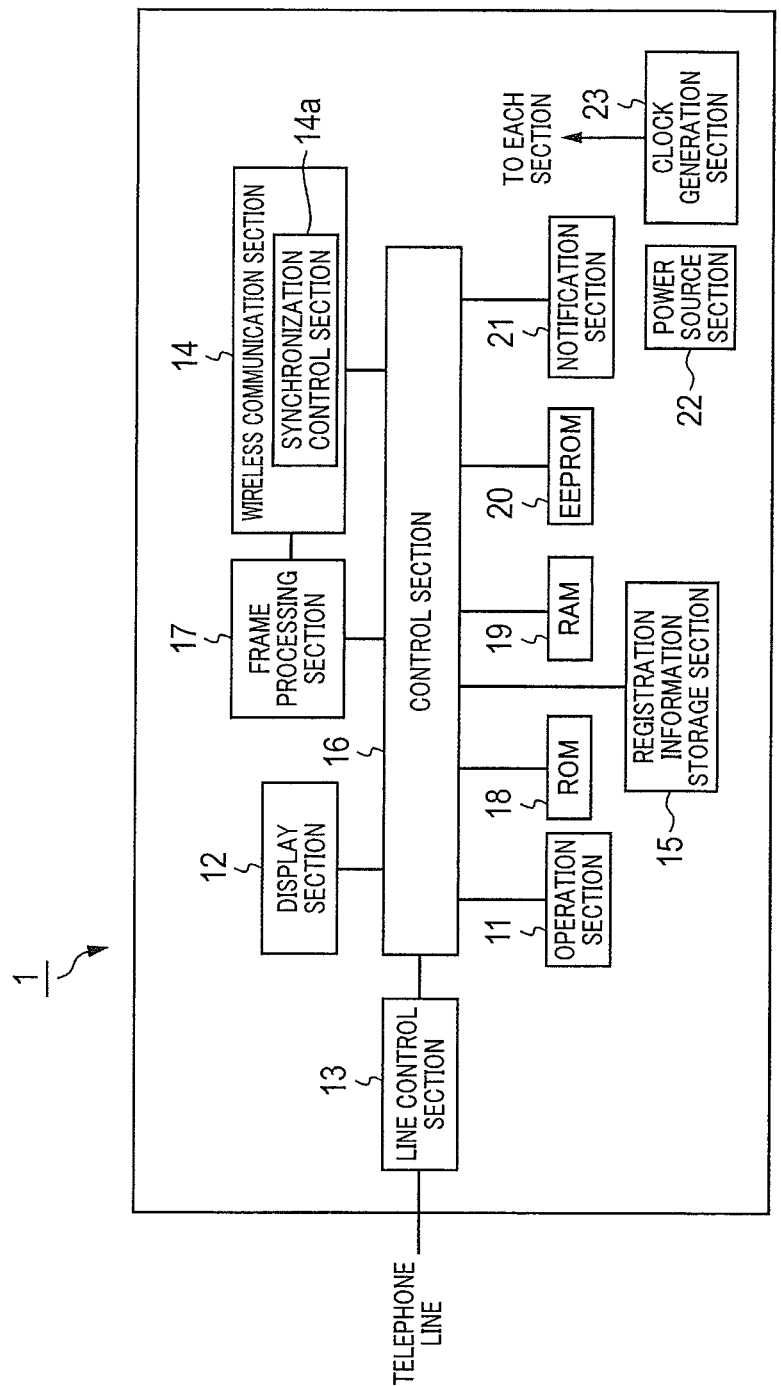
FIG. 4 is a block diagram illustrating an example of the configuration of a base unit according to an embodiment of the present invention.

Next, a configuration example of base unit 1 is described. FIG. 4 is a block diagram illustrating a configuration example of base unit 1.

In FIG. 4, base unit 1 has power supply section 22, clock generation section 23, line control section 13, operation section 11, display section 12, frame processing section 17, wireless communication section 14, control section 16, ROM 18, RAM 19, EEPROM 20, notification section 21 and registration information storage section 15.

Power supply section 22 supplies a power source to operate base unit 1.

Clock generation section 23 generates a clock signal to be used to operate each section of base unit 1, on the basis of the power source supplied from power supply section 22. This clock signal is a reference clock to operate each section of base unit 1 and define the communication timing of wireless communication section 14. For example, clock generation section 23 includes a crystal oscillation circuit.

Line control section 13 is an interface to communicate with a wired telephone line, and realizes call transmission and call reception.

Operation section 11 is a button to receive user's various operations. Examples of the user's operations include an operation to download registration information (registration information download operation) to portable unit 4 (a portable unit to be added as a calling apparatus of locator 3). For example, operation section 11 includes a touch panel placed on the surface of the above-mentioned liquid crystal display.

Display section 12 displays registration information stored in registration information storage section 15. Moreover, display section 12 may also be used to output other information (for example, a telephone number or an operation menu of base unit 1). For example, display section 12 includes a liquid crystal display.

Frame processing section 17 embeds frame transmission information suitable for an operation mode at that time and passes it to wireless communication section 14. In the case of performing communication with locator 3, a frame configuration for the locator is used.

Wireless communication section 14 performs wireless communication with portable unit 2 with a TDMA/TDD communication protocol. In the present embodiment, wireless communication section 14 performs the wireless communication with the DECT protocol, for example. Synchronization control section 14a determines the communication timing of a communication signal by wireless communication section 14 on the basis of the reference clock of clock generation section 23.

Control section 16 controls the operation of entirety of base unit 1 by cooperating with each section described above. The control made by control section 16 is described later. Here, for example, control section 16 contains a CPU (Central Processing Unit).

ROM 18 stores a control program and various kinds of data that are used by control section 16.

RAM 19 and EEPROM 20 are work memories of control section 16.

When a call signal is received from line control section 13, notification section 21 outputs the notification sound. For example, notification section 21 includes a small speaker.

Registration information storage section 15 stores the ID of portable unit 2. That is, registration information storage section 15 stores registration information received from portable unit 2. Registration information storage section 15 can store multiple items of registration information from multiple portable units. Moreover, registration information storage section 15 stores the locator ID acquired via portable unit 2 in association with the portable unit ID in a one-to-one correspondence.

Here, the function sections provided to base unit 1 are not limited to the function sections illustrated in FIG. 4 and may include another function section. Another function section may realize a primary function of base unit 1 or realize an auxiliary function to assist the primary function.

The configuration example of base unit 1 has been described above.

Figure 5:
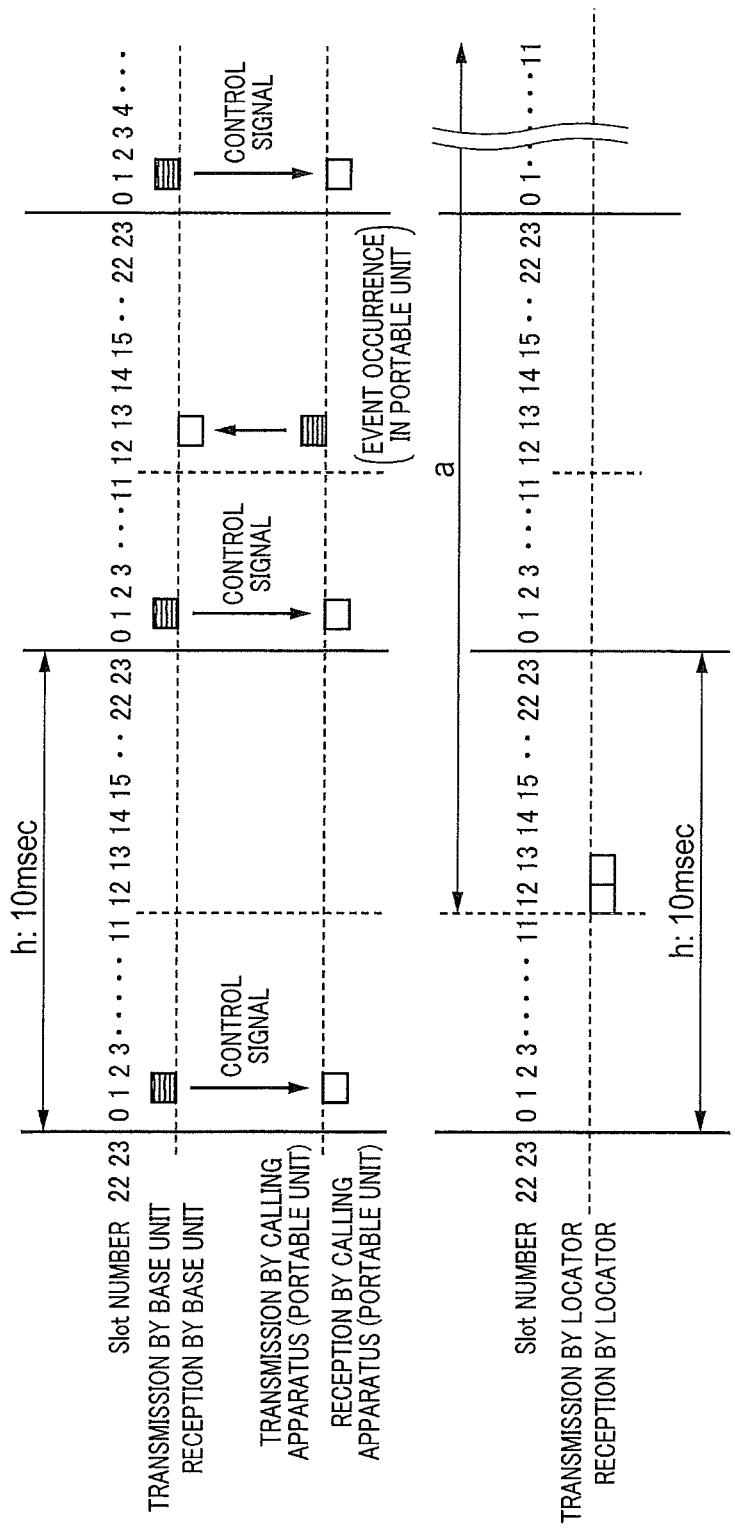
FIG. 5 is a timing chart illustrating slots during normal operation in a locator system according to an embodiment of the present invention.

Next, a configuration example of a communication frame in TDMA communication to be used in the present embodiment is described. FIG. 5 illustrates an operation example of base unit 1, portable unit 2 and locator 3 in a normal state. In wireless communication in DECT, for example, as illustrated in FIG. 5, a time-sharing system is used in which 10 msec is set as one frame and one frame is divided into 24 slots to perform communication. That is, the time length dividing one frame (10 msec) into 24 equal parts is set as one slot and any slot is assigned to each communication apparatus every time communication starts. When base unit 1 and another communication apparatus (for example, portable unit 2) start communication, the other communication apparatus (for example, portable unit 2) selects any slot and starts communication with base unit 1.

Base unit 1 always transmits a control signal using a slot (for example, slot "1") that is determined every frame. The control signal serving as a synchronization signal includes synchronous data (for example, Syncword). Syncword that is synchronous data is a known bit sequence determined beforehand for timing synchronization and becomes synchronization information for synchronization of portable unit 2. The cutout and import of a frame is started at the timing this known digit sequence is found on the reception side. A unique Syncword is assigned by transmission by the base unit and transmission by the portable unit in the DECT scheme. Base unit 1 transmits the base unit ID by the control signal, and the portable unit acquires the base unit ID while receiving the control signal, compares it with the ID of a standby base unit (registered base unit) and selects a base unit to be synchronized. Here, transmission from the portable unit to the base unit is not performed every frame at the time of standby of the portable unit, and transmission from the portable unit to the base unit is performed only when some events (such as a call request) occur in the portable unit or it turns into a call state.

Thus, portable unit 2 receives the control signal from base unit 1 that is the master, and operates in synchronization with the communication timing of base unit 1. That is, when a time lag is generated between portable unit 2 and base unit 1, portable unit 2 detects the time position of Syncword included in the control signal and immediately corrects the communication timing by the use of the detection result. Here, portable unit 2 determines a correction parameter at the time of asynchronization according to acquired time lag information and holds it in RAM 35.

In a normal telephone mode, a control signal is periodically received from predetermined base unit 1, and portable unit 2 is in a state where it can perform synchronization on the basis of the control signal from base unit 1. Base unit 1 operates as a synchronous master of portable unit 2. Here, although a method of synchronization is the same even in a locator protocol described below, in this case, portable unit 2 becomes a synchronous master, Syncword is included in a locator call signal to be transmitted by portable unit 2, and the locator can be synchronized with portable unit 2.

Figure 6:
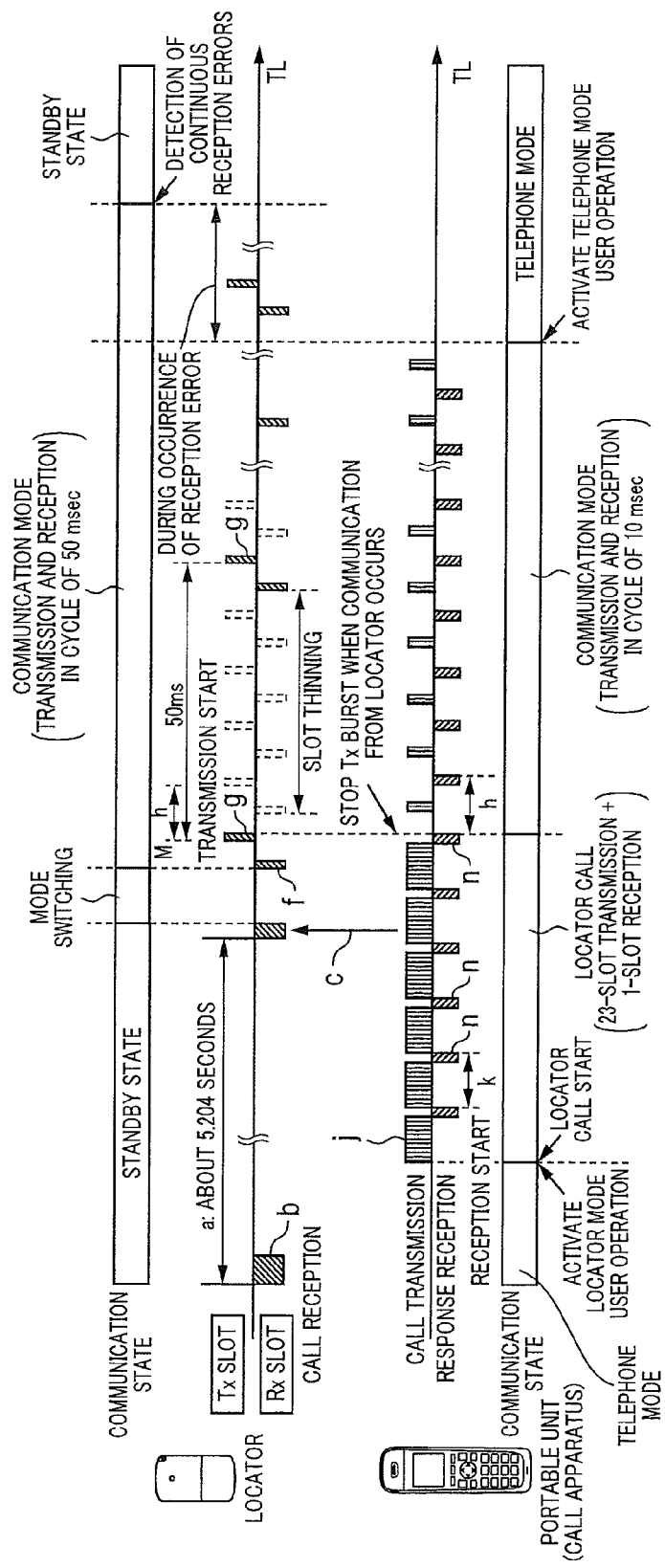
FIG. 6 is a timing chart illustrating an example of a locator call during normal operation in a locator system according to an embodiment of the present invention.

In the following, a normal operation example of the above-mentioned locator system is described. FIG. 6 is a timing chart illustrating the communication operation between a portable unit (calling apparatus) and a locator. The portable unit illustrated in FIG. 6 is portable unit 2 described above and the locator illustrated in FIG. 6 is locator 3. In FIG. 6, TL indicates the time axis and it is assumed that time advances as it proceeds from the left to the right in the figure. Moreover, in the figure, the upper side of time axis TL shows a transmission slot (or transmission signal) and the lower side of time axis TL shows a reception slot (or reception signal).

First, when locator 3 is in a call standby state where it waits for reception of a call signal from portable unit 2, locator 3 operates as follows. That is, as illustrated in FIG. 6, control section 46 of locator 3 controls wireless communication section 45 so as to receive the call signal by the use of reception slot "b," and controls timer section 44 so as to time period "a." Timer section 44 counts the low-speed clock of first clock generation section 48. Further, when the count value reaches expiration, switch 50 switches from the OFF state to the ON state and timer section 44 starts the power supply to wireless communication section 45. By this means, wireless communication section 45 starts operation so as to receive the call signal by the use of reception slot "b."

Period "a" consists of 24 slots (1 frame)×520+1 slot, that is, 520 frames+1 slot, which is about 5.204 seconds. Here, above-mentioned "520" is the number defined beforehand and is not limited to this. Thus, making period "a" in a call standby state "+1 slot" instead of integral multiple of 24 slots (1 frame) allows locator 3 to shift the slot position every reception and thereby to be resilient to interference.

Moreover, reception slot "b" of locator 3 normally consists of two consecutive slots, which is about 0.0084 seconds. The reason why reception slot "b" consists of two consecutive slots is as follows. That is, although locator 3 has to receive a call signal of one slot from portable unit 2, locator 3 and portable unit 2 are not synchronized during the call standby. Therefore, it is difficult for locator 3 to receive the call signal of only one slot. Therefore, if locator 3 is designed to perform the reception for two consecutive slots, it can perform reception for one slot even if they are not synchronized.

When the user performs a calling operation in portable unit 2 during the call standby of locator 3, transmission of call signal "j" from portable unit 2 is started. That is, in portable unit 2, when operation section 27 receives a calling operation, control section 28 activates timer section 33 and performs control so as to transmit call signal "j" in a predefined slot in a frame for a predetermined time from wireless communication section 24 first and wait for (receive) a response signal from locator 3 in other slots.

For example, after transmitting a locator call signal in slot 0 of a certain frame, portable unit 2 next transmits the locator call signal in slot 0 in a frame 10 msec after, and transmits the locator call signal in slot 0 every h:10 msec thereafter. Locator 3 that is the slave receives the locator call signal from portable unit 2 and transmits a response signal according to time information written in this locator call signal.

Further, after transmitting call signal j until timer section 33 ends the time keeping of a predetermined time, control section 28 waits for reception of the response signal in reception slot n. As described above, locator 3 transmits the response signal at the time written in the locator call signal (c), that is, transmits the response signal in reception slot n and switches a mode. Moreover, when portable unit 2 can normally receive the response signal (g) from locator 3 (n), portable unit 2 switches call signal transmission to periodic transmission only by one slot, and portable unit 2 and locator 3 start transmission and reception operated in synchronization with the communication timing of portable unit 2.

Control section 28 of portable unit 2 transmits the call signal during a predetermined time (for example, constant time e). However, control section 28 of portable unit 2 controls wireless communication section 24 so as to periodically perform reception operation not continuously, but only in one slot in cycle k (slot n) and perform reception standby operation to receive the response signal from locator 3. In a case where it is not possible to normally receive the response signal from locator 3, control section 28 performs control such that the transmission of call signal j in cycle k and the reception standby of the response signal are repeated until it receives the response signal from locator 3.

Moreover, when the locator mode ends, portable unit 2 tries to receive a control signal from the base unit. Upon reception of the control signal from base unit 1, portable unit 2 returns to a normal telephone mode and operates in synchronization with the communication timing of base unit 1 as described above. Here, when control section 28 of portable unit 2 does not receive the response signal until the time timer section 33 ends the time keeping of a predetermined time (for example, constant time e), control section 28 stops the transmission of call signal j and the reception standby of the response signal.

Figure 7:
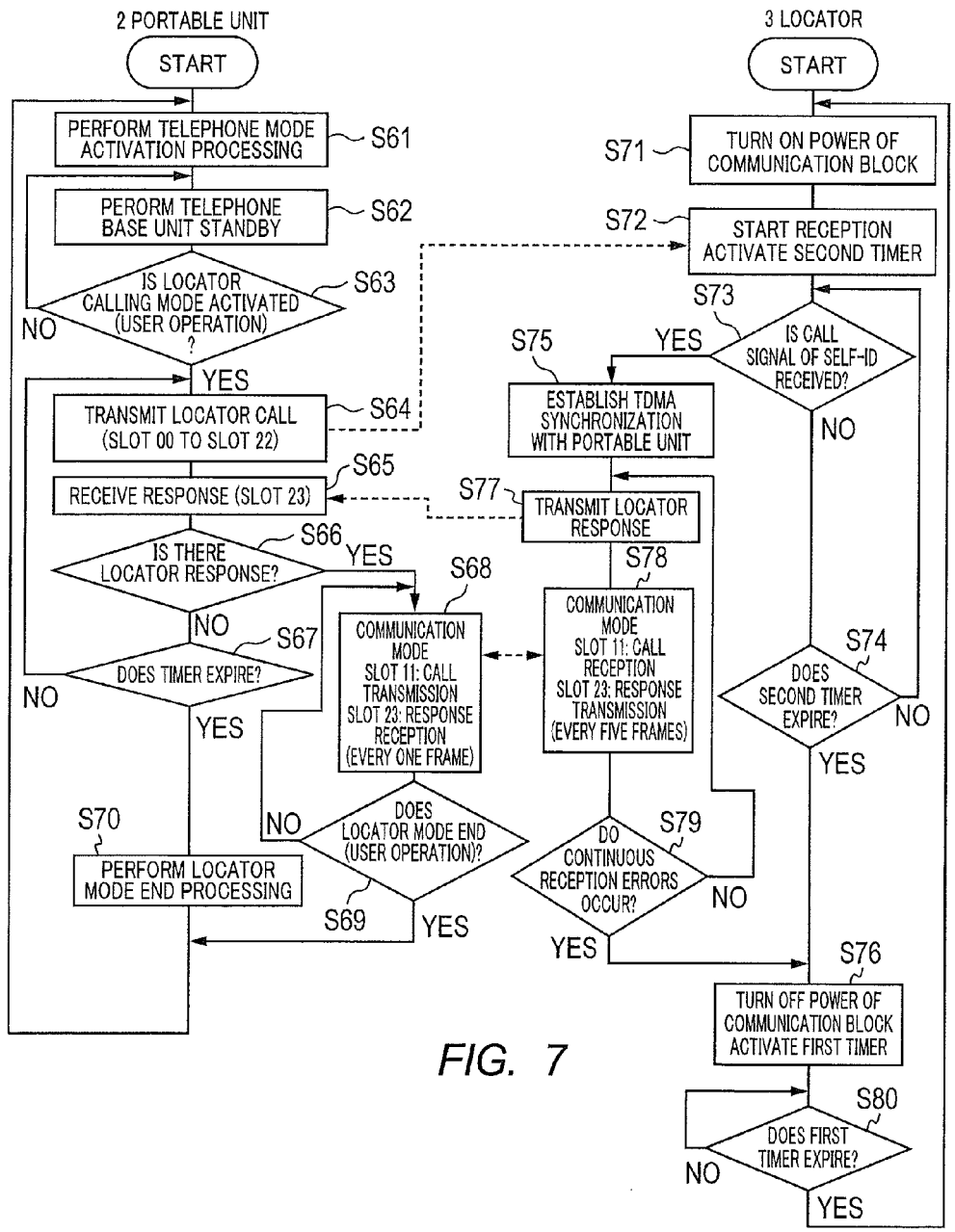
FIG. 7 is a flowchart illustrating an example of normal operation in a locator system according to an embodiment of the present invention.

FIG. 7 is a flowchart illustrating an example of normal operation in the present locator system.

In step S61, control section 28 of portable unit 2 that starts operation after being powered on activates the telephone mode. In the telephone mode, portable unit 2 can perform speech communication with other telephone devices connected via a public telephone line network through base unit 1.

In step S62, control section 28 gives an instruction to wireless communication section 24 to receive a control signal from base unit 1 and control portable unit 2 to be in the standby state of base unit 1.

In step S63, control section 28 determines whether operation section 27 receives a locator calling operation.

As a result of the determination in step S63, when operation section 27 does not receive the locator calling operation (S63: NO), the flow returns to step S62. Meanwhile, as a result of the determination in step S63, when operation section 27 receives the locator calling operation (S63: YES), a locator calling mode is activated and the flow proceeds to step S64.

In step S64, control section 28 transmits a locator call signal to call locator 3 (to output the notification sound from locator 3) from wireless communication section 24. Moreover, control section 28 activates timer section 33 using transmission of the locator call signal as a trigger. By this means, timer section 33 starts time keeping of a predetermined time. Moreover, the locator ID indicating the calling target locator is included in the locator call signal.

Meanwhile, locator 3 operates as follows.

In step S71, for example, the communication block is powered on when a switch connected with a power supply circuit is turned on.

In step S72, control section 46 of locator 3 gives an instruction to wireless communication section 45 to start reception operation. Moreover, wireless communication section 45 uses the start of reception of the locator call signal as a trigger and the second timer is activated by timer section 42 that counts the high-speed clock from second clock generation section 49. Moreover, in step S72, control section 46 gives an instruction to wireless communication section 45 to receive the locator call signal from the portable unit side.

In step S73, control section 46 determines whether the locator call signal including the self-ID is received.

As a result of the determination in step S73, when the locator call signal including the self-ID is not received (S73: NO), the flow proceeds to step S74. Meanwhile, as a result of the determination in step S73, when the locator call signal including the self-ID is received (S73: YES), the flow proceeds to step S75.

In step S74, control section 46 determines whether the second timer expires. As a result of the determination in step S74, when the second timer does not expire (S74: NO), the flow returns to step S73. Meanwhile, as a result of the determination in step S74, when the second timer expires (S74: YES), the flow proceeds to step S76.

When the locator call signal including the self-ID is received, in step S75, control section 46 establishes TDMA synchronization with portable unit 2 that is the transmission source of the locator call signal through wireless communication section 45.

In step S77, control section 46 instructs wireless communication section 45 to transmit a locator response signal that is the response to the locator call signal, and transmits the locator response signal (hereafter referred to as "locator response") from wireless communication section 45.

Meanwhile, after transmitting the locator call signal, portable unit 2 operates as follows.

In step S65, portable unit 2 performs processing to receive a response from locator 3 until timer section 33 expires.

In step S66, control section 28 of portable unit 2 determines whether wireless communication section 24 receives the locator response from locator 3.

As a result of the determination in step S66, when wireless communication section 24 does not receive the locator response (S66: NO), the flow proceeds to step S67. Meanwhile, as a result of the determination in step S66, when wireless communication section 24 receives the locator response (S66: YES), the flow proceeds to step S68.

In step S67, control section 28 determines whether timer section 33 expires.

As a result of the determination in step S67, when timer section 33 does not expire (S67: NO), the flow returns to step S64. Meanwhile, as a result of the determination in step S67, when timer section 33 expires while the locator response is not received (S67: YES), the flow proceeds to step S70.

In step S68, according to the above-mentioned locator protocol, portable unit 2 becomes a synchronization master, locator 3 receives a locator call signal to be transmitted by portable unit 2 and portable unit 2 receives a locator response signal to be transmitted by locator 3.

In step S69, control section 28 determines whether operation section 27 receives an operation to end the locator calling mode.

As a result of the determination in step S69, when operation section 27 does not accept the operation regarding the locator calling (S69: NO), the flow returns to step S68. Meanwhile, as a result of the determination in step S69, when operation section 27 receives the operation regarding the locator calling (S69: YES), the flow proceeds to step S70.

In step S70, control section 28 performs processing to end the locator calling mode.

Meanwhile, after transmitting the locator response signal in step S77, locator 3 operates as follows.

In step S78, according to the locator protocol, locator 3 performs reception of the locator call signal and transmission of the locator response signal in synchronization with portable unit 2.

In step S79, control section 46 of locator 3 monitors whether continuous reception errors occur.

As a result of the monitoring in S79, when the continuous reception errors do not occur (S79: NO), the flow returns to step S77. Meanwhile, as a result of the monitoring in S79, when the continuous reception errors occur (S79: YES), the flow proceeds to step S76. Here, the flow proceeds to step S76 also when the second timer expires as described above (S74: YES).

In step S76, control section 46 interrupts a power source to the communication block. By this means, the communication operation of locator 3 is stopped. Moreover, in locator 3, using the interruption of the power source to the communication block as a trigger, the first timer is activated by timer section 44 that counts the low-speed clock from first clock generation section 48. Thereafter, the first timer counts up while the communication operation of locator 3 is stopped.

In step S80, control section 46 determines whether the first timer expires.

As a result of the determination in step S80, when the first timer does not expire (S80: NO), control section 46 makes a determination in step S80 again. Meanwhile, as a result of the determination in step S80, when the first timer expires (S80: YES), control section 46 returns processing to step S71 again. Further, when the power source is turned on to the communication block in step S71, control section 46 gives an instruction to wireless communication section 45 to start reception operation in step S72. Thereafter, the operation in step S73 and subsequent steps described above is performed again.

Thus, by operating the locator calling by operation section 27 of portable unit 2, portable unit 2 performs wireless communication with locator 3 by the locator protocol. Moreover, locator 3 can periodically perform reception operation by the count of the first timer and receive the locator call signal from portable unit 2. In this case, locator 3 performs synchronization according to a control signal from portable unit 2 that is the master, and corrects the communication timing according to the reception timing of the control signal from portable unit 2.

Figure 8:
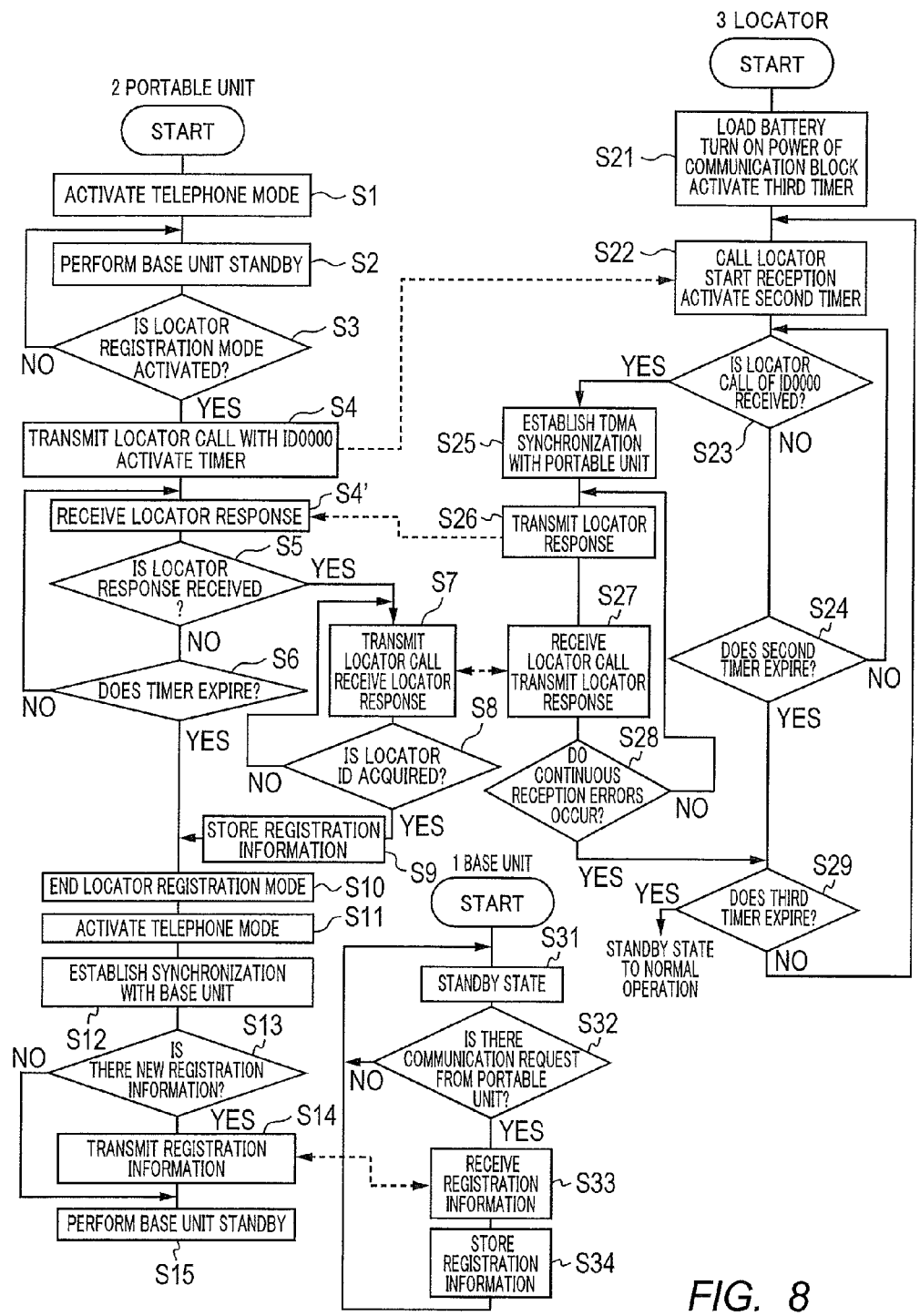
FIG. 8 is a flowchart illustrating an example of operation of locator registration and registration information registration in a locator system according to an embodiment of the present invention.
Figure 9:
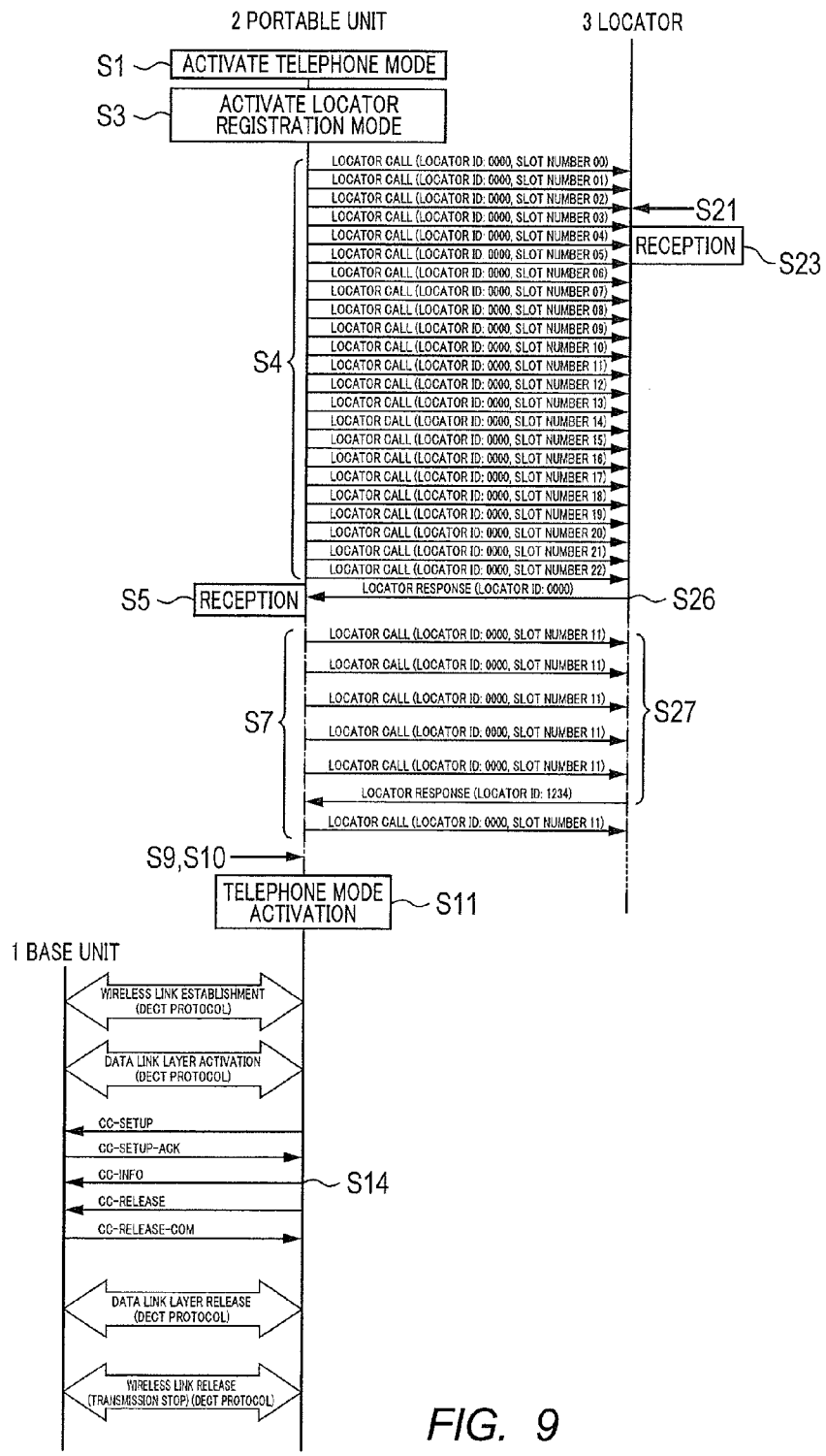
FIG. 9 is a diagram illustrating an example of signals exchanged during operation of locator registration and registration information registration in a locator system according to an embodiment of the present invention.

Next, using FIGS. 8 and 9, an explanation is given to operation to register portable unit 2 and locator 3 in a one-to-one correspondence (locator registration operation) and operation to register registration information registered in portable unit 2 in base unit 1 (registration information registration operation). FIG. 8 is a flowchart illustrating an example of the locator registration operation and the registration information registration operation. Moreover, FIG. 9 is a diagram illustrating the exchange of signals in the flow of FIG. 8. Here, in FIG. 9, the same reference numerals are assigned to parts corresponding to the step in FIG. 8.

In step S1, control section 28 of portable unit 2, which is powered on to start operation, activates a telephone mode. In the telephone mode, portable unit 2 can perform speech communication with other telephone devices connected via a public telephone line network through base unit 1.

In step S2, control section 28 gives an instruction to wireless communication section 24 to receive a control signal from base unit 1 and control portable unit 2 to be in the standby state of base unit 1.

In step S3, control section 28 determines whether to activate a locator registration mode, on the basis of whether operation section 217 receives a locator registration operation. The locator registration mode is a mode to register portable unit 2 and locator 3 in a one-to-one correspondence.

As a result of the determination in step S3, when operation section 27 does not receive the locator registration operation (S3: NO), the flow returns to step S2. Meanwhile, as a result of the determination in step S3, when operation section 27 receives the locator registration operation (S3: YES), the flow proceeds to step S4.

In step S4, control section 28 transmits a locator call signal to call locator 3 (to output the notification sound from locator 3) from wireless communication section 24. This locator call signal includes the locator ID (for example, 0000) showing an unspecified locator. Moreover, control section 28 activates timer section 33 using the transmission of the locator call signal as a trigger. By this means, timer section 33 starts time keeping of a predetermined time period.

In step S4', after transmitting the locator call signal in step S4, portable unit 2 performs processing to receive a locator response signal from locator 3 until timer section 33 expires.

Here, the locator call signal is transmitted using slot numbers 00 to 22 as illustrated in step S4 in FIG. 9. Further, each locator call signal includes the locator ID (for example, 0000) showing an unspecified locator. Here, slot number 23 is used to receive the locator response signal from the locator that received the locator call signal.

Meanwhile, locator 3 operates as follows.

In step S21, when a battery is loaded in power supply section 41 in locator 3, the power source is turned on to the communication block. Further, control section 46 of locator 3 activates the third timer in timer section 42. The activation of this third timer allows control section 46 to put locator 3 into a state where locator 3 can be registered with portable unit 2 in a one-to-one correspondence.

In step S22, control section 46 gives an instruction to wireless communication section 45 to receive a locator call signal from portable unit 2. Moreover, control section 46 activates the second timer in timer section 42 as triggered by wireless communication section 45 starting the reception of the locator call signal.

In step S23, control section 46 determines whether a locator call signal whose locator ID is 0000 is received. This locator ID"0000" denotes a code that does not show a specific locator and shows that the portable unit requests the registration of a locator. The locator starts operation according to the registration request of the portable unit by receiving this locator ID"0000.38

As a result of the determination in step S23, when the locator call signal whose locator ID is 0000 is not received (S23: NO), the flow proceeds to step S24. Meanwhile, as a result of the determination in step S23, when the locator call signal whose locator ID is 0000 is received (S23: YES), the flow proceeds to step S25.

In step S24, control section 46 determines whether the second timer in timer section 42 expires.

As a result of the determination in step S24, when the second timer does not expire (S24: NO), the flow returns to step S23. Meanwhile, as a result of the determination in step S24, when the second timer expires (S24: YES), the flow proceeds to step S29.

In step S25, control section 46 establishes TDMA synchronization with portable unit 2 that is the transmission source of the locator call signal, through wireless communication section 45.

In step S26, control section 46 gives an instruction to wireless communication section 45 to transmit a locator response signal that is the response to the locator call signal.

By this means, wireless communication section 45 transmits the locator response signal. Here, as illustrated in step S26 in FIG. 9, the locator response is a response to the locator call signal whose locator ID is 0000.

Meanwhile, portable unit 2 operates as follows.

In step S5, control section 28 of portable unit 2 determines whether wireless communication section 24 receives the locator response signal from locator 3. As described above, the slot of slot number 23 is used for the reception of the locator response signal.

As a result of the determination in step S5, when wireless communication section 24 does not receive the locator response signal(S5: NO), the flow returns to step S6.

Meanwhile, as a result of the determination in step S5, when wireless communication section 24 receives the locator response signal (S5: YES), the flow proceeds to step S7.

In step S6, control section 28 determines whether timer section 33 activated in step S4 expires.

As a result of the determination in step S6, when timer section 33 does not expire (S6: NO), the flow returns to step S4'. Meanwhile, as a result of the determination in step S6, when timer section 33 expires (S6: YES), the flow proceeds to step S10.

In step S7, control section 28 controls wireless communication section 24 and transmits a locator call signal. Thereafter, when a locator response signal is transmitted from locator 3, wireless communication section 24 receives the locator response signal.

Meanwhile, locator 3 operates as follows.

In step S27, when a locator call signal is transmitted from portable unit 2, wireless communication section 45 receives the locator call signal. Thereafter, locator 3 transmits its own locator ID to portable unit 2. That is, control section 46 reads out the locator ID of locator 3 from ID storage section 40 and transmits a locator response signal including the locator ID from wireless communication section 45.

Here, as illustrated in step S7 in FIG. 9, the locator call signal is transmitted from portable unit 2 every single frame. Slot number 11 is used to transmit and receive the locator call signal. Moreover, locator ID 0000 is included in the locator call signal. Meanwhile, as illustrated in step S27 in FIG. 9, the locator response is transmitted from locator 3 every five frames. Slot number 23 is used to transmit and receive the locator response. Moreover, the locator ID of locator 3 (for example, 1234) is included in the locator response.

Thus, portable unit 2 performs wireless communication with locator 3 by the locator protocol. Locator 3 performs synchronization according to the locator call signal from portable unit 2 that is the master, and corrects the communication timing according to the reception timing of the locator call signal from portable unit 2.

In step S28, control section 46 determines whether continuous reception errors of the locator call signal occur. The continuous reception errors mean that the locator call signal is not continuously received by a predetermined number (for example, two slots).

As a result of the determination in step S28, when the continuous reception errors do not occur (S28: NO), the flow returns to step S26. Meanwhile, as a result of the determination in step S28, when the continuous reception errors occur (S28: YES), the flow proceeds to step S29.

In step S29, control section 46 determines whether the third timer in timer section 42 expires.

As a result of the determination in step S29, when the third timer does not expire (S29: NO), the flow returns to step S22. Meanwhile, as a result of the determination in step S29, when the third timer expires (S29: YES), control section 46 causes locator 3 to shift to a standby state (a state to wait for a call from portable unit 2, which is also referred to as "normal operation").

Meanwhile, portable unit 2 operates as follows.

In step S8, control section 28 determines whether to be able to acquire the locator ID from the locator response.

As a result of the determination in step S8, when it is not possible to acquire the locator ID (S8: NO), the flow returns to step S7. Meanwhile, as a result of the determination in step S8, when it is possible to acquire the locator ID (S8: YES), the flow proceeds to step S9.

In step S9, control section 28 stores the acquired locator ID in registration information storage section 36 as registration information.

In step S10, control section 28 terminates the locator registration mode. By this means, the locator registration operation, that is, registration of portable unit 2 and locator 3 in a one-to-one correspondence is completed. Thereafter, upon receiving a locator call signal (including the ID of locator 3) from portable unit 2, locator 3 outputs a predetermined notification sound from notification section 38.

In step S11, control section 28 activates a telephone mode using the end of the locator registration mode in step S10 as a trigger.

In step S12, controlling wireless communication section 24 and receiving a control signal from base unit 1 allows control section 28 to establish synchronization with base unit 1 by the DECT protocol. At this time, as illustrated in FIG. 9, the establishment of a wireless link and the activation of a data link layer are performed between portable unit 2 and base unit 1. Thereafter, CC (Call Control)-SETUP is transmitted from portable unit 2 to base unit 1 and CC-SETUP-ACK is transmitted from base unit 1 to portable unit 2.

In step S31, control section 16 of base unit 1 gives an instruction to wireless communication section 14 to receive a signal from the portable unit and control base unit 1 to be in a standby state.

In step S32, control section 16 determines whether there is a communication request from portable unit 2 in the waiting state at any time.

As a result of the determination in step S32, when there is no communication request from portable unit 2 (S32: NO), the flow returns to step S31. Meanwhile, as a result of the determination in step S32, when there is the communication request from portable unit 2 (S32: YES), the flow proceeds to step S33.

In step S13, control section 28 of portable unit 2 determines whether there is new registration information in the registration information stored in registration information storage section 36. The new registration information is registration information which is newly registered in portable unit 2 and which is not registered in base unit 1 yet. Here, setting a flag or the like at the time of registering (transmitting) registration information in base unit 1 allows control section 28 to know that the registration information has been registered in base unit 1. By this means, control section 28 can make the determination in step S13.

As a result of the determination in step S13, when there is no new registration information (S13: NO), the flow proceeds to step S15. Meanwhile, as a result of the determination in step S13, when there is the new registration information (S13: YES), the flow proceeds to step S14.

In step S14, control section 28 reads out the new registration information from registration information storage section 36 and controls wireless communication section 24 to transmit the new registration information to base unit 1. This transmission corresponds to CC-INFO as illustrated in step S14 in FIG. 9. Further, as illustrated in FIG. 9, CC-RELEASE is transmitted from portable unit 2 to base unit 1 and CC-RELEASE-COM is transmitted from base unit 1 to portable unit 2. Thereafter, as illustrated in FIG. 9, the release of a data link layer and the release of a wireless link are performed between portable unit 2 and base unit 1.

In step S15, control section 28 controls portable unit 2 to be in a standby state of base unit 1.

Meanwhile, base unit 1 operates as follows.

In step S33, upon receiving the registration information from portable unit 2, wireless communication section 14 of base unit 1 transmits this to control section 16.

In step S34, control section 16 saves the received registration information in registration information storage section 15. By this means, registration information registration operation, that is, the registration of new registration information in base unit 1 is completed.

According to such operation in FIGS. 8 and 9, the locator is in a state where it can be registered with the portable unit in a one-to-one correspondence for a certain time after a battery is loaded. Therefore, for the user, there is an advantage that a locator registration operation does not have to be performed on the locater side.

Moreover, according to the operation in FIGS. 8 and 9, when the new registration information has been saved, the portable unit automatically starts wireless communication with the base unit without depending on the user's operation and transmits the saved registration information to the base unit. The base unit automatically saves the registration information received from the portable unit without depending on the user's operation. That is, only by registering the portable unit and the locator, transmission of the registration information from the portable unit to the base unit and its registration are automatically performed. Therefore, for the user, there is an advantage that it is not necessary to perform an operation to transmit registration information from the portable unit to the base unit for registration.

The locator registration operation and the registration information registration operation in the locator system have been described thus far.

Figure 10:
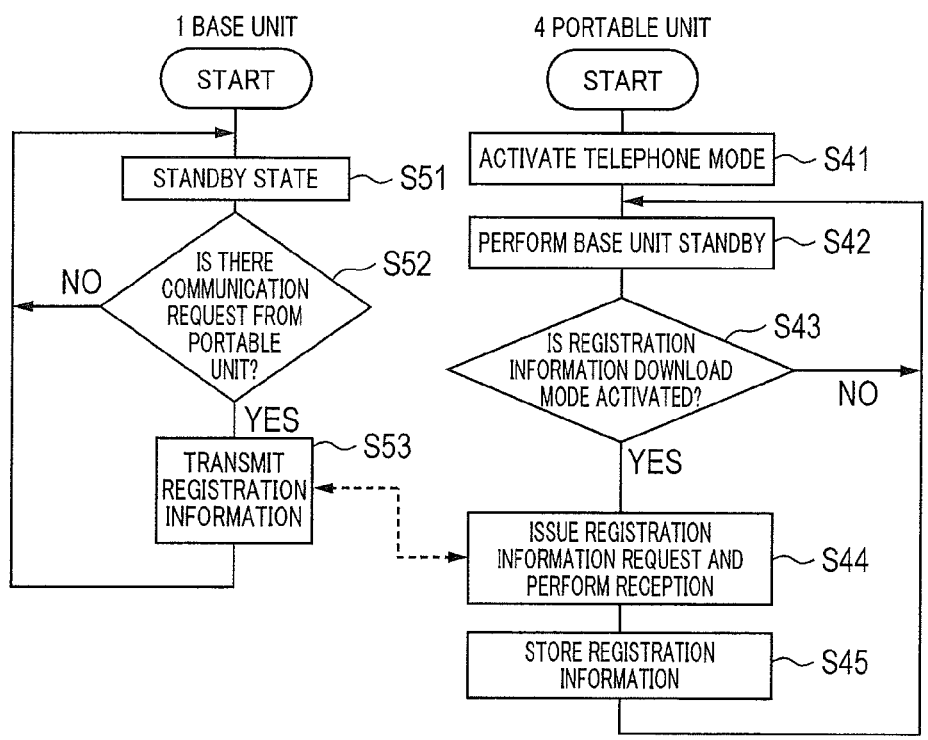
FIG. 10 is a flowchart illustrating an example of registration information download operation in a locator system according to an embodiment of the present invention.
Figure 11:
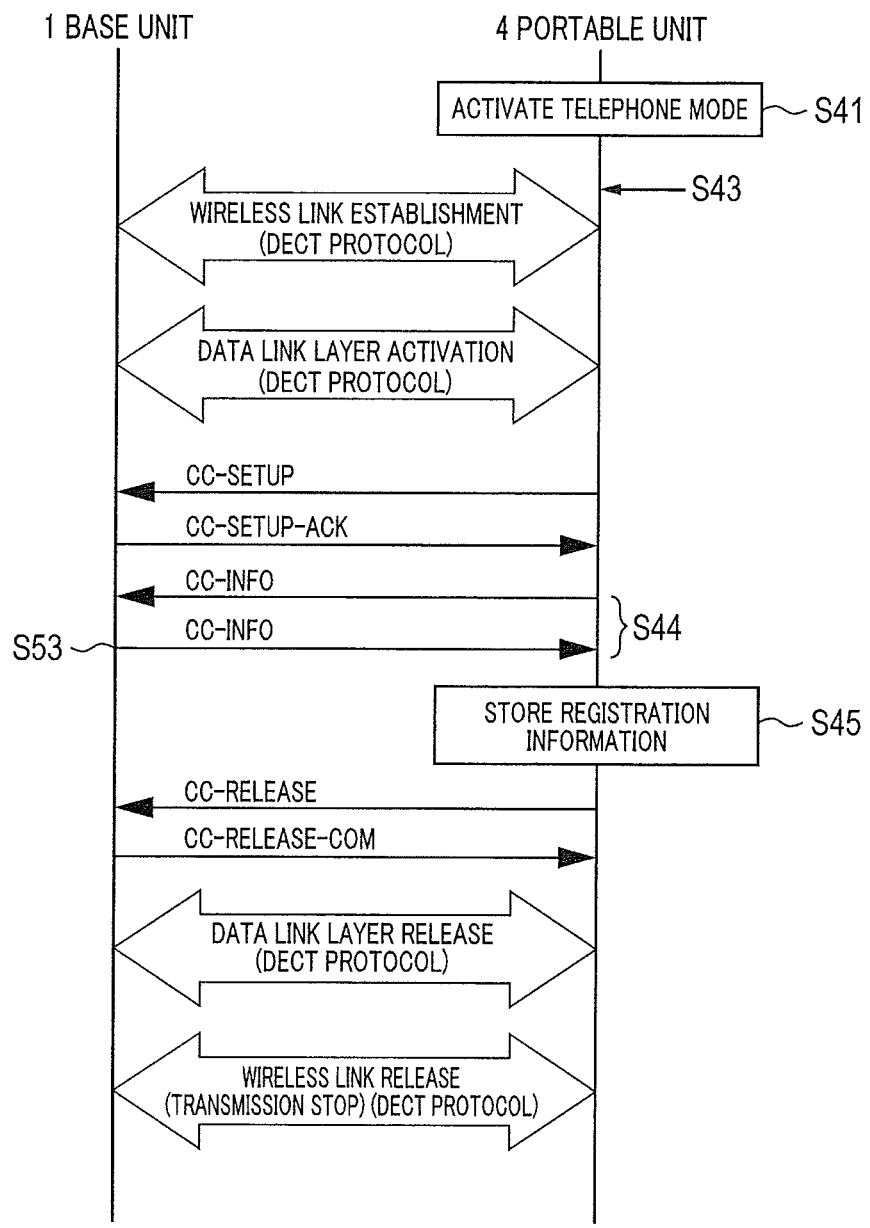
FIG. 11 is a diagram illustrating an example of signals exchanged at the time of registration information download in a locator system according to an embodiment of the present invention.

Next, operation (registration information download operation) to download registration information from base unit 1 to portable unit 4 to be added is described using FIGS. 10 and 11. The registration information of the download target is, for example, the locator ID of locator 3 with which portable unit 2 is registered in a one-to-one correspondence. FIG. 10 is a flowchart illustrating one example of registration information download operation. Moreover, FIG. 11 is a diagram illustrating the exchange of signals in the flow of FIG. 10. Here, in FIG. 11, the same reference numerals are assigned to parts corresponding to the steps in FIG. 10.

In step S51, control section 16 of base unit 1 controls base unit 1 to be in a standby state.

In step S52, control section 16 determines whether there is a communication request from portable unit 4 in the waiting state at any time. Portable unit 4 is a device to be newly added as a calling apparatus of locator 3 besides portable unit 2.

As a result of the determination in step S52, when there is no communication request from portable unit 4 (S52: NO), the flow returns to step S51. Meanwhile, as a result of the determination in step S52, when there is a communication request from portable unit 4 (S52: YES), the flow proceeds to step S53.

Meanwhile, portable unit 4 operates as follows.

In step S41, control section 28 of portable unit 4 activates a telephone mode.

In step S42, control section 28 controls portable unit 4 to be in a standby state of base unit 1.

In step S43, control section 28 determines whether to activate a registration information download mode, based on whether operation section 27 receives a registration information download operation. The registration information download mode is a mode to download registration information registered in base unit 1 to portable unit 4 to be added.

As a result of the determination in step S43, when operation section 27 does not receive the registration information download operation (S43: NO), the flow returns to step S42. Meanwhile, as a result of the determination in step S43, when operation section 27 accepts the registration information download operation (S43: YES), the flow proceeds to step S44.

Here, although it is not illustrated, when the flow proceeds to step S44, control section 28 activates the registration information download mode and establishes synchronization with base unit 1 by the DECT protocol. At this time, as illustrated in FIG. 11, the establishment of a wireless link and the activation of a data link layer are performed between portable unit 4 and base unit 1. Thereafter, CC-SETUP is transmitted from portable unit 4 to base unit 1 and CC-SETUP-ACK is transmitted from base unit 1 to portable unit 4.

In step S44, control section 28 gives an instruction to wireless communication section 24 to request the download of registration information. By this means, a signal that requests the download of the registration information is transmitted from wireless communication section 24 to base unit 1. This request is CC-INFO as illustrated in FIG. 11. Thereafter, when the registration information is transmitted from base unit 1, wireless communication section 24 receives the registration information.

Meanwhile, base unit 1 operates as follows.

In step S53, upon receiving the registration information download request from portable unit 4, control section 16 of base unit 1 reads out registration information from registration information storage section 15. Further, control section 16 controls wireless communication section 14 to transmit the read registration information to portable unit 4.

This transmission is CC-INFO as illustrated in FIG. 11. Here, the flow returns to step S51 after step S53.

Meanwhile, portable unit 4 operates as follows.

In step S45, upon receiving the registration information from wireless communication section 24, control section 28 of portable unit 4 saves the registration information in registration information storage section 36. At this time, control section 28 stores the portable unit ID of portable unit 4 stored in advance in registration information storage section 36 and the registration information (locator ID) acquired from base unit 1 in a one-to-one correspondence in registration information storage section 36. By this means, similar to portable unit 2, by holding the ID of locator 3 in registration information storage section 36, the registration of portable unit 4 and locator 3 in one-to-one correspondence is completed. Thereafter, upon receiving a locator call signal (including the ID of locator 3) from portable unit 4, locator 3 outputs a predetermined notification sound from notification section 43. Thereafter, as illustrated in FIG. 11, CC-RELEASE is transmitted from portable unit 4 to base unit 1 and CC-RELEASE-COM is transmitted from base unit 1 to portable unit 4. Thereafter, as illustrated in FIG. 11, the release of a data link layer and the release of a wireless link are performed between portable unit 4 and base unit 1.

According to such operation in FIGS. 10 and 11, by acquiring registration information from the base unit, the registration of a portable unit to be added and the locator can be completed. Therefore, for the user, there is an advantage that it is not necessary to perform a registration operation with the locator by the use of the portable unit to be added. As a result, for example, the following advantages are obtained. When the locator is already attached to a specific item and its presence is unclear, if there is only one portable unit that has been registered with that locator, it takes time for detection. Here, if registration information is downloaded from the base unit to another portable unit, even when the presence of the locator is unclear, the registration of another portable unit and the locator whose presence is unclear is completed. Therefore, it is possible to use another portable unit to detect the locator and the item, and the efficiency of detection improves.

The registration information download operation in the locator system has been described above.

As described above, in the locator system according to the present embodiment, every time a calling apparatus and a locator are registered, the registration information is summarized in a management apparatus. Further, by acquiring the registration information from the management apparatus, a calling apparatus to be added gets in a state where the registration with a locator registered with another calling apparatus is completed.

Therefore, the locator system according to the present embodiment can facilitate the registration of the calling apparatus to be added and the locator. As a result, it is possible to easily increase a calling apparatus and detect a locator by the use of a plurality of calling apparatuses.

Although a description of the present embodiment has been provided, the above-mentioned explanation is only an example and various modifications are possible.

For example, although a case has been described as an example where the present invention is implemented by hardware in the above-mentioned embodiment, the present invention can be implemented by software in cooperation with hardware.

Moreover, for example, although portable unit 2 activates a telephone mode using the end of a locator registration mode as a trigger (steps S10 and S11) in the above-mentioned explanation of FIG. 8, the present invention is not limited to this configuration. For example, the trigger may be the end of storing registration information in step S9. Moreover, for example, portable unit 2 may activate the telephone mode using the user's operation or the like as a trigger and perform the operation in step Si 1 and subsequent steps after temporarily terminating the locator registration mode.

Moreover, for example, although the above-mentioned locator is configured to notify the user of the location of the locator by outputting the notification sound of the locator itself, the notification method is not limited to this. For example, it is possible to employ a configuration in which the location of the locator is displayed on a screen or the like in a portable unit.

The disclosure of Japanese Patent Application No. 2012-226719, filed on Oct. 12, 2012, including the specification, drawings and abstract, is incorporated herein by reference in its entirety.

INDUSTRIAL APPLICABILITY

The wireless communication apparatus and locator system according to the present invention are useful for an apparatus, system, method and program or the like that detect an item by using near field wireless communication.

REFERENCE SIGNS LIST

1 Base unit
2, 4 Portable unit
3 Locator
5, 20, 37 EEPROM
11, 27 Operation section
12, 25 Display section
13 Line control section
14, 24, 45 Wireless communication section
14a Synchronization control section
15, 36 Registration information storage section
16, 28, 46 Control section
17, 29, 47 Frame processing section
18, 34, 51 ROM
19, 35, 52 RAM
21, 38, 43 Notification section
22, 31, 41 Power supply section
23, 32 Clock generation section
26 Call section
33, 42, 44 Timer section
40 ID storage section
48 First clock generation section
49 Second clock generation section
50 Switch

The invention claimed is:

1. A wireless communication apparatus configured to communicate with a management apparatus using a first near field wireless communication protocol and to transmit, using a second near field wireless communication protocol, a call signal to a locator attachable to an item, the wireless communication apparatus comprising:

a controller configured to enter into a registration mode, in which the controller registers the locator in a one-to-one correspondence with the wireless communication apparatus using the second near field wireless communication protocol, and into a communication mode, in which the controller controls communication with the management apparatus using the first near field wireless communication protocol, wherein entry into the communication mode from the registration mode is automatically triggered by completion of the one-to-one registration of the locator with the wireless communication apparatus; and a transmitter coupled to the controller and configured to communicate with the locator using the second near field wireless communication protocol in the registration mode, and to switch to the communication mode to transmit registration information of the locator to the management apparatus using the first near field wireless communication protocol.

2. The wireless communication apparatus according to claim 1, wherein, the wireless communication apparatus and the management apparatus form a cordless telephone system, in which the wireless communication apparatus serves as a portable unit and the management apparatus serves as a base unit.

3. The wireless communication apparatus according to claim 1, wherein the first near field wireless communication protocol is a TDMA (Time Division Multiple Access) / TDD (Time Division Duplex) protocol.

4. The wireless communication apparatus according to claim 1, wherein the second near field wireless communication protocol is a communication protocol compliant with the first near field wireless communication protocol with respect to a wireless format and a frequency.

5. A wireless communication management apparatus configured to communicate with a calling apparatus using a first near field wireless communication protocol, wherein the calling apparatus is configured to transmit, using a second near field wireless communication protocol, a call signal to a locator attachable to an item, the wireless communication management apparatus comprising:
 a receiver configured to receive registration information of the locator, wherein transmission of the registration information from the calling apparatus is automatically triggered by completion of a one-to-one registration of the locator with the calling apparatus, which causes a transmitter of the calling apparatus to switch from a registration mode that uses the second near field wireless communication protocol to a communication mode that uses the first near field wireless communication protocol;
 a registration information storage configured to store the received registration information; and
 a transmitter configured to transmit the stored registration information to a different calling apparatus different from the calling apparatus when a download request for the registration information is received from the different calling apparatus.

6. The wireless communication management apparatus according to claim 5, which serves as a base unit of a cordless telephone system, in which the calling apparatus and the different calling apparatus serve as portable units.

7. The wireless communication management apparatus according to claim 5, wherein the first near field wireless communication protocol is a TDMA (Time Division Multiple Access)/TDD (Time Division Duplex) protocol.

8. A locator system comprising:
 a locator that is attachable to an item and that is configured to output a notification sound;
 a calling apparatus that is configured to transmit, using a second near field wireless communication protocol, a call signal to the locator to cause the locator to output the notification sound; and
 a management apparatus configured to communicate with the calling apparatus using a first near field wireless communication protocol, wherein
 the calling apparatus comprises: i) a controller configured to enter into a registration mode, in which the controller registers the locator in a one-to-one correspondence with the wireless communication apparatus using the second near field wireless communication protocol, and into a communication mode, in which the controller controls communication with the management apparatus using the first near field wireless communication protocol, wherein entry into the communication mode from the registration mode is automatically triggered by completion of the one-to-one registration of the locator with the wireless communication apparatus; and ii) a transmitter configured to communicate with the locator using the second near field wireless communication protocol in the registration mode, and to switch to the communication mode to transmit registration information of the locator to the management apparatus using the first near field wireless communication protocol.

9. The locator system according to claim 8, wherein the management apparatus comprises:
 receiver configured to receive the registration information of the locator;
 a registration information storage configured to store the received registration information; and
 transmitter configured to transmit the stored registration information to a different calling apparatus different from the calling apparatus when a download request for the registration information is received from the different calling apparatus.

10. The locator system according to claim 8, wherein the locator comprises a locator controller configured to enter into a first mode, in which the locator may be registered with the calling apparatus in a one-to-one correspondence, when a battery is loaded, and enters into a second mode, in which the locator receives the call signal from the calling apparatus, upon expiration of a defined period since the battery is loaded.

11. The locator system according to claim 8, wherein:
 the calling apparatus and the management apparatus form a cordless telephone system; and
 the calling apparatus serves as a portable unit of the cordless telephone system and the management apparatus serves as a base unit of the cordless telephone system.

12. The locator system according to claim 8, wherein the first near field wireless communication protocol is a TDMA (Time Division Multiple Access)/TDD (Time Division Duplex) protocol.

13. The locator system according to claim 8, wherein the second near field wireless communication protocol is a communication protocol compliant with the first near field wireless communication protocol with respect to a wireless format and a frequency.

* * * * *